Figure 1:
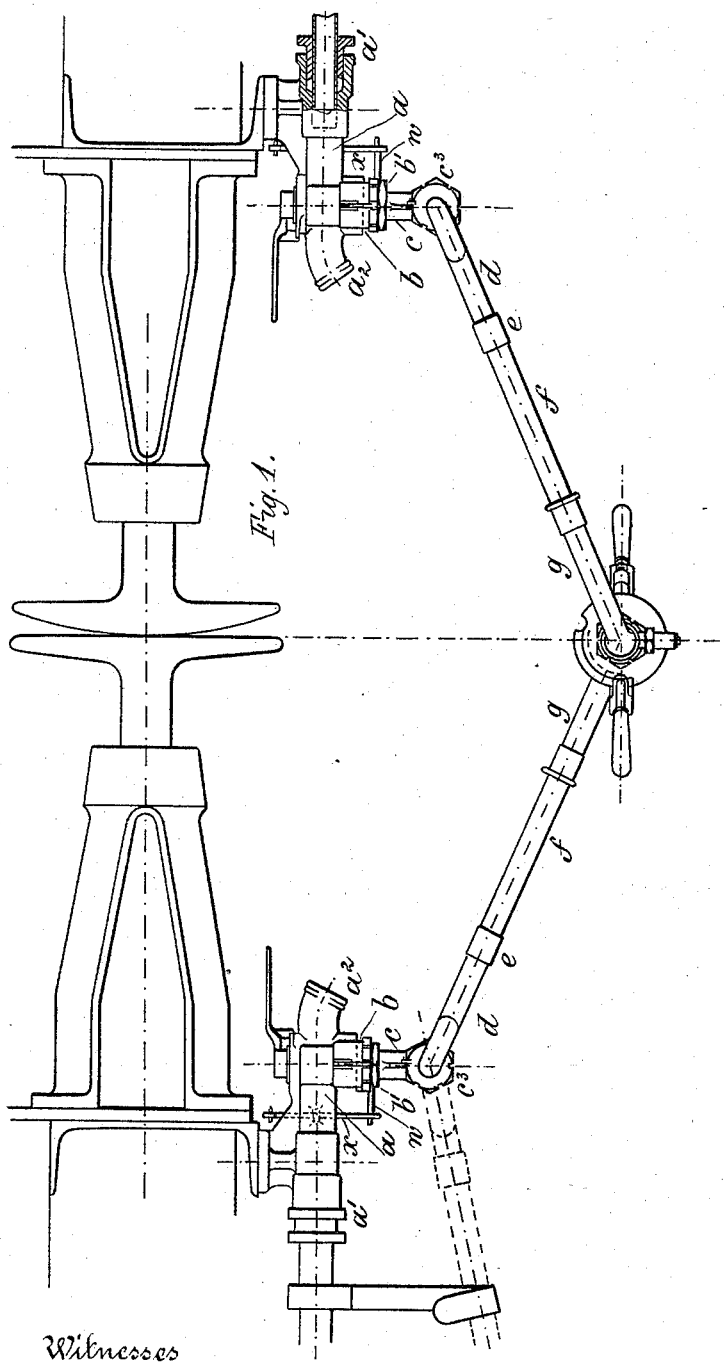

(No Model.) 3 Sheets—Sheet 1.

F. KÉMENTZY, Jr.
STEAM PIPE COUPLING FOR HEATING RAILWAY CARS.

No. 535,907. Patented Mar. 19, 1895.

Witnesses

Inventor
Franz Kémentzy Junior
per Heinrich Lade
Attorney (No Model.) 3 Sheets—Sheet 2.
F. KÉMÉNTZY, Jr.
STEAM PIPE COUPLING FOR HEATING RAILWAY CARS.
No. 535,907. Patented Mar. 19, 1895.
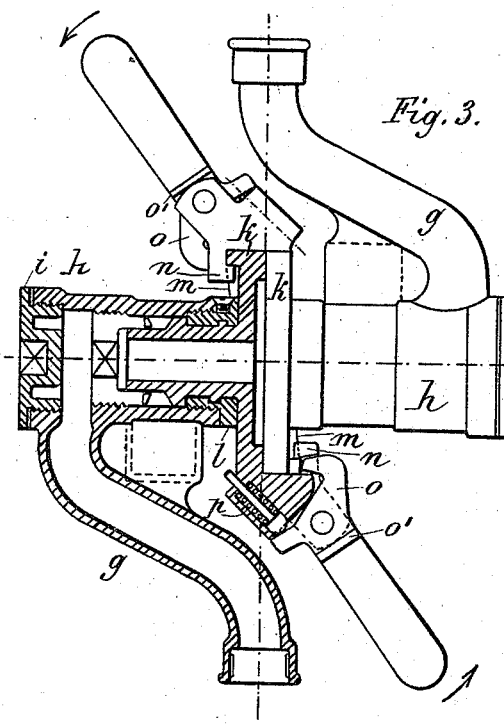
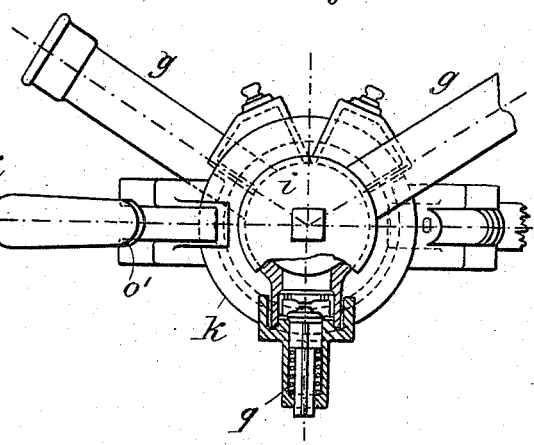
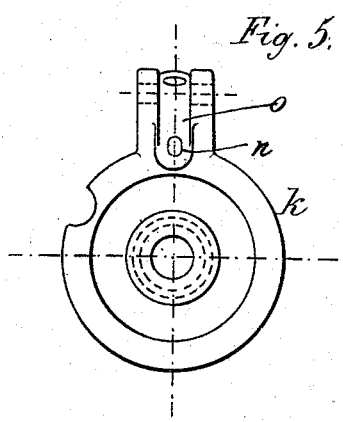
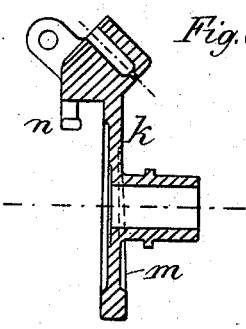
Witnesses
Inventor
Franz Keméntzy Junior
per Heinrich Lade
Attorney (No Model.) 3 Sheets—Sheet 3.
F. KÉMÉNTZY, Jr.
STEAM PIPE COUPLING FOR HEATING RAILWAY CARS.
No. 535,907. Patented Mar. 19, 1895.
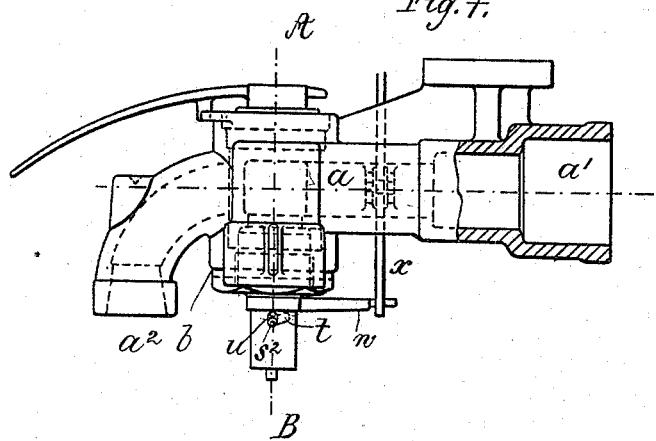
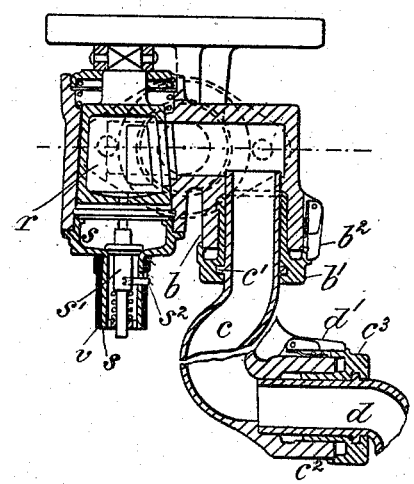
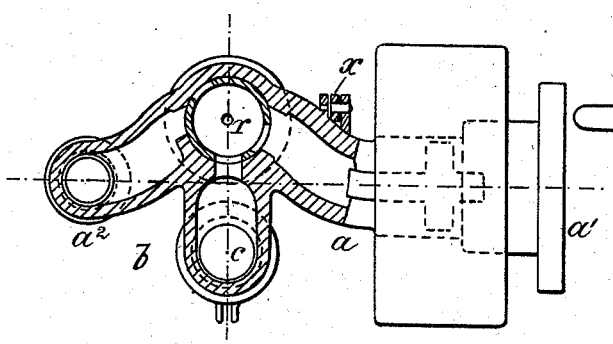
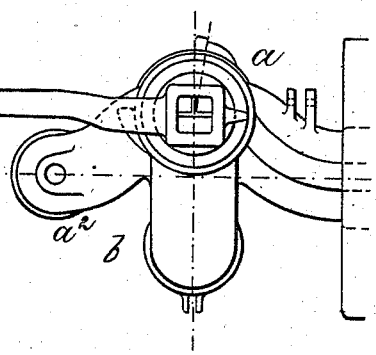
Witnesses
Inventor
Franz Keméntzy Junior
per Heinrich Lade
Attorney

UNITED STATES PATENT OFFICE.

FRANZ KÉMÉNTZY, JR., OF BUDA-PESTH, AUSTRIA-HUNGARY.

STEAM-PIPE COUPLING FOR HEATING RAILWAY-CARS.

SPECIFICATION forming part of Letters Patent No. 535,907, dated March 19, 1895.

Application filed February 5, 1894. Serial No. 499,234. (No model.) Patented in England February 12, 1891, No. 2,542; in Belgium February 14, 1891, No. 93,765; in France February 14, 1891, No. 211,387; in Germany February 19, 1891, No. 61,808, and June 29, 1891, No. 67,175, and in Italy February 25, 1891, No. 29,241.

*To all whom it may concern:*

Be it known that I, FRANZ KÉMÉNTZY, Jr., a subject of the Emperor of Austria-Hungary, residing at the city of Buda-Pesth, in the Kingdom of Austria-Hungary, have invented a certain new and useful Coupling for Steam-Pipes Used for Heating Railway-Carriages, (for which I have obtained patents in the German Empire, Nos. 61,808 and 67,175, bearing date, respectively, February 19, 1891, and June 29, 1891; a patent in the Kingdom of Great Britain and Ireland, No. 2,542, bearing date February 12, 1891; in the Kingdom of Belgium, No. 93,765, bearing date February 14, 1891; in the Republic of France, No. 211,387, bearing date February 14, 1891, and in the Kingdom of Italy, No. 29,241, bearing date February 25, 1891;) and I do hereby declare that the following is a full, clear, and exact description of the invention, which will enable others skilled in the art to which it appertains to make and use the same.

This invention relates to improvements in couplings for the steam heating pipes of railway carriages and the object of the invention is, first, to provide a jointed metal tubular connection in place of caoutchouc pipes; secondly, to couple the heating pipe of one carriage link-like with that of another, and, thirdly, to render it practicable to couple carriages provided with the old coupling of elastic material with carriages that are provided with the metal coupling of this invention. The coupling comprises a metal pipe consisting of two similar sets of parts jointedly attached to and moving on one another, a middle coupling part at the free end of each set of jointed tubular parts by which the two sets of parts are coupled together, and a universal elbow piece by means of which, carriages provided with a steam heating pipe coupling of elastic material may be coupled to carriages provided with the coupling of this invention. These objects are attained in the manner shown in the accompanying drawings, in which—

Figure 2:
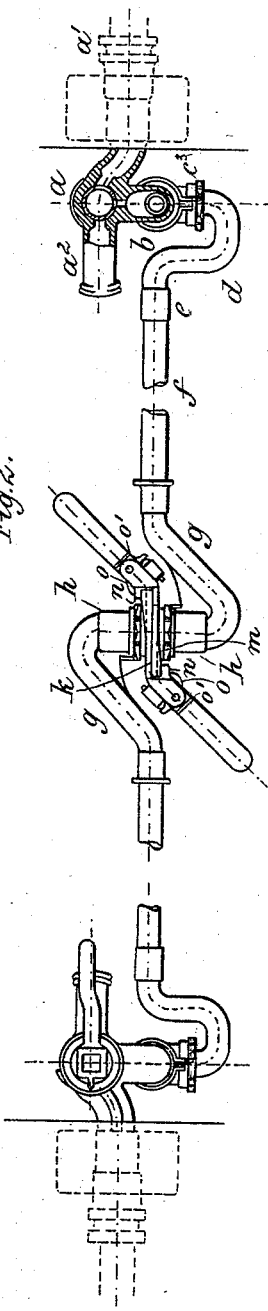

Figure 1 is a side view of the steam heating pipe coupling; Fig. 2, a top view of the same partly in section; Fig. 3, a side view of the middle coupling parts partly in section, and Fig. 4 a top view. Figs. 5 and 6 are respectively a face view and a vertical section of a disk of the middle coupling parts; Fig. 7, a side view of the universal elbow piece; Fig. 8, a vertical section through line A—B of Fig. 7; Figs 9 and 10, top views of the universal elbow piece, the former partly in section.

$a$ is the universal elbow piece by which the steam heating pipe coupling is attached to the carriages. At one end of elbow piece $a$ there is a stuffing box $a'$ in which is entered one end of the heating pipe carried underneath the carriage and which permits of an unimpeded expansion and contraction of the main pipe.

$a^2$ is a part branching from elbow piece $a$ and serving when necessary for the attachment of a steam heating pipe coupling of elastic material as ordinarily used with a screwing on device.

$b$ is a second stuffing box for the reception of the end of the coupling pipe piece $c$ which is so carried therein that it may freely turn on its vertical axis without being displaced from its position. This is accomplished by providing piece $c$ with a collar $c'$ which is loosely held in the correspondingly recessed head $b'$ of the stuffing box gland constructed for this purpose in two parts, said gland screwing on to the end of the stuffing box and securely holding the end of piece $c$ in the same. Accidental turning of the gland is prevented by the engagement of a lever $b^2$ in a notch on the stuffing box head $b'$. The opposite end of piece $c$ has a stuffing box $c^2$ for the reception of bend $d$ capable of turning on its horizontal axis. This bend is secured in the stuffing box in the same way as piece $c$, $c^3$ being the recessed head of the gland and $d'$ the fixing lever.

$f$ is a straight metal pipe of any suitable length fixed at one end in the end socket $e$ of bend $d$ and at the other end in the end socket of pipe $g$.

The middle coupling device is composed of two coupling parts or similar halves each of which consists of a casing $h$ with pipe $g$, said casing being closed at one end by a screw cover $i$, the opposite end receiving the tubular nave or pipe extension of a coupling disk $k$ which is held therein by means of a divided or two part screw collar $l$. Therefore each coupling disk $k$ may turn on its axis. Each disk is provided with an inclined plane $m$ and a locking hook $n$. When the two disks are turned around against one another and in opposite directions the locking hook $n$ of the one will engage the inclined plane $m$ of the other and lock them firmly together so as to be like one piece which may turn freely around in a circle. In this coupled position the two disks $k$ are prevented from working loose by means of a spring lever $o$ mounted between the cheeks of a locking hook $n$ of each disk and each engaging the inclined plane of the opposite disk and also the inner side of its locking hook $n$. Each lever $o$ is also provided with a collar $o'$ at the outer rising or eccentric edges of the cheeks between which it is mounted. Upon turning levers $o$ each by its handle in the direction of the arrows (Fig. 3) the hook part of each is pressed firmly against the inclined plane $m$ of the opposite disk and jammed against the inner side of its locking hook and by collars $o'$ also against the rising edges of the side cheeks, in which position the levers $o$ are retained by springs $p$.

The two coupling disks $k$ are rendered steam tight by means of a packing disk placed between them in the central recess. Any water of condensation collecting in the coupling is discharged past valve $q$.

In the universal elbow piece $a$ the branch pipe $a^2$ of which serves for the connection, by means of the ordinary screwing up device, of the usual india rubber tube coupling, there is a four way cock $r$ by means of which, according as the plug is turned, steam may be turned on from the main heating pipe to pass through branch pipe $a^2$ into the india rubber coupling tube, or to pass at $b$ into the metal coupling of the invention, or both these ways may be closed and the steam discharged past valve $s'$ located at the bottom of cock $r$. This valve also serves for the discharge of the water of condensation from the main heating pipe. $s$ is the valve casing and $s'$ the valve into which is screwed a stud $s^2$ engaging in an oblique slot $t$ formed in the valve casing and also in a slot $u$ formed in a sleeve $v$ surrounding the valve casing. In order to maintain a certain pressure in the steam heating pipe, which should not exceed forty-five pounds per square inch, it is necessary to be able to lift the valve at a comparatively high pressure. This is accomplished by turning around sleeve $v$ whereby stud $s^2$ is slid upward in the oblique slot $t$ of valve casing $s$ so as to lift valve $s'$ from its seat and allow the steam to pass out. When the pressure falls to seven pounds per square inch, valve $s'$ is opened automatically by the coil spring placed around the stem of the same, any water of condensation that may have collected in the main heating pipe then running off. For the purpose of turning sleeve $v$ from a distance, it is placed in connection with levers $w$ and $x$ of suitable length.

What I claim as my invention, and desire to secure by Letters Patent, is—

1. A metal coupling for the steam pipes used for heating railway carriages, having, for the purpose of connecting the coupling tubes of two carriages, a middle coupling device formed of two disks or flanges $k$ casings $h$ in which said disks turn each disk being provided with an inclined plane $m$ and locking hook $n$, in combination with spring levers $o$, for the purpose specified, substantially as described and shown.

2. In the metal coupling hereinbefore described, the combination of a middle coupling device for the purpose of connecting the coupling tubes of two carriages, consisting of two disks or flanges $k$, casings $h$ in which said disks turn, each disk being provided with an inclined plane $m$, locking hook $n$ and spring levers $o$, with a multiple branch elbow piece $a$ having a stuffing box $a'$ for the reception of the end of the heating pipe located underneath the carriage, a branch pipe $a^2$ for the attachment of a caoutchouc steam heating pipe coupling, a stuffing box $b$ for the reception of the end of the metal coupling, a four way cock $r$ and a valve $s$, $s'$, for the purpose specified, substantially as described and shown.

3. In a valve for the discharge of water of condensation and steam, the combination with the valve casing $s$ provided with an oblique slot $t$, of valve $s'$ provided with stud $s^2$ engaging said slot, and sleeve $v$ mounted to turn on the valve casing and provided with a slot $u$ engaging said stud, substantially as described and shown.

In witness whereof I have hereunto signed my name in the presence of two subscribing witnesses.

FRANZ KÉMÉNTZY, JR.

Witnesses:
 JOHN RANZENBERGER,
 PAUL LIPTAY.